US012759447B2

(12) United States Patent
Mauffrey et al.

(10) Patent No.: US 12,759,447 B2
(45) **Date of Patent: *Oct. 13, 2026**

(54) VEHICLE SEAT BACKREST

(71) Applicant: FAURECIA Sièges d'Automobile, Nanterre (FR)

(72) Inventors: Jean-Marie Mauffrey, Champagney (FR); Jean-Yves Piederriere, Angerville (FR); Etienne Poulet, Poulet (FR); Benoît Gazaniol, Arpajon (FR); Didier Duriez, Le Plessis-Pâté (FR)

(73) Assignee: FAURECIA Sièges d'Automobile, Nanterre (FR)

(*) Notice: Subject to any disclaimer, the term of this patent is extended or adjusted under 35 U.S.C. 154(b) by 22 days.

This patent is subject to a terminal disclaimer.

(21) Appl. No.: 18/779,818

(22) Filed: Jul. 22, 2024

(65) Prior Publication Data

US 2024/0375568 A1 Nov. 14, 2024

Related U.S. Application Data

(63) Continuation of application No. 17/545,329, filed on Dec. 8, 2021, now Pat. No. 12,077,076.

(30) Foreign Application Priority Data

Dec. 9, 2020 (FR) ..................................... 20 12942

(51) Int. Cl.
*B60N 2/66* (2006.01)
*B60N 2/56* (2006.01)
(Continued)

(52) U.S. Cl.
CPC ........... *B60N 2/665* (2015.04); *B60N 2/5621* (2013.01); *B60R 2011/0015* (2013.01); *B60R 11/0217* (2013.01)

(58) Field of Classification Search
CPC ...... B60N 2/665; B60N 2/5621; B60N 2/646; B60N 2/686; B60N 2/894; B60N 2/6009;
(Continued)

(56) References Cited

U.S. PATENT DOCUMENTS 4,607,887 A 8/1986 Vail
5,441,331 A 8/1995 Vento
(Continued)

FOREIGN PATENT DOCUMENTS

CN 110626241 12/2019
CN 213383970 6/2021
(Continued)

OTHER PUBLICATIONS

Office Action (Non-Final Rejection) dated Dec. 6, 2022 for U.S. Appl. No. 17/545,319, B2020600 US-U || (pp. 1-7).
(Continued)

*Primary Examiner* — David R Dunn
(74) *Attorney, Agent, or Firm* — Barnes & Thornburg LLP

(57) ABSTRACT

A backrest of a vehicle seat comprises a backrest armature, at least one central upholstery module and two side upholstery modules each arranged on a respective side of the central upholstery module. Each of the at least three upholstery modules is fixed to the backrest armature independently of the other two upholstery modules.

19 Claims, 8 Drawing Sheets

Figure 1:
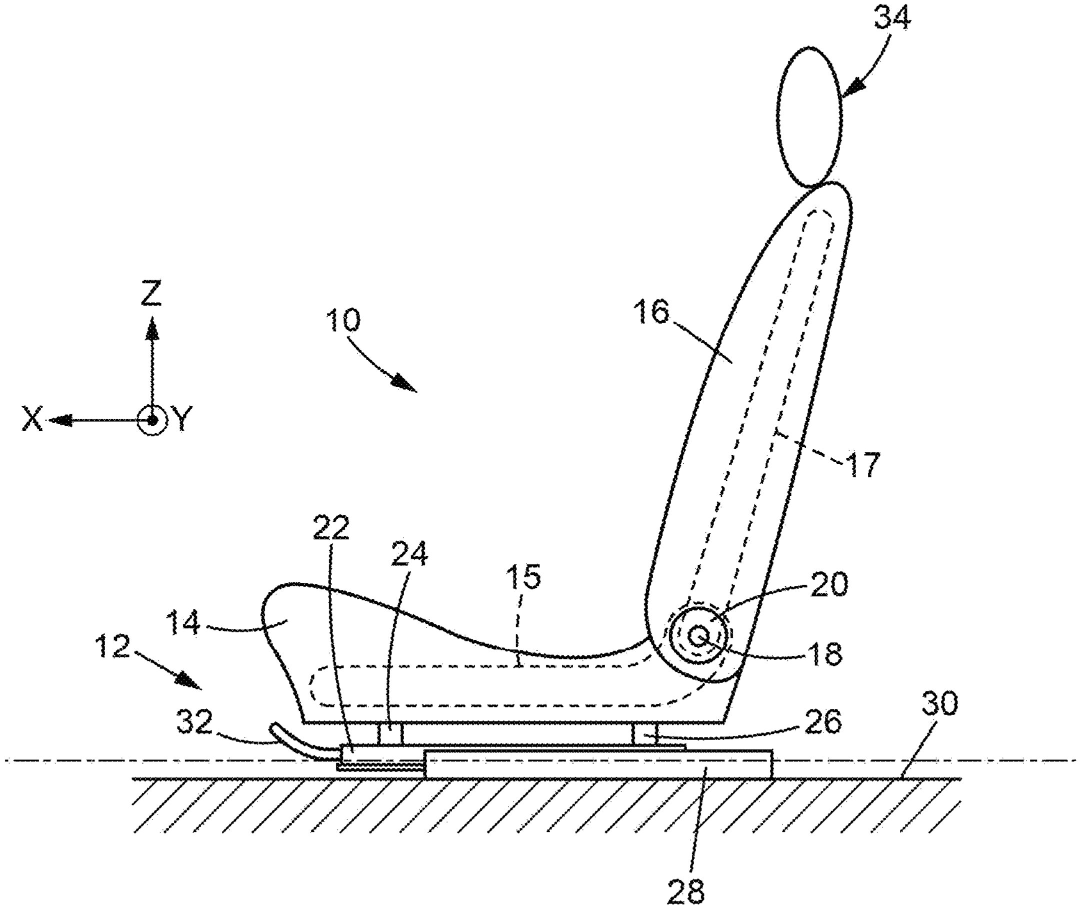

(51) Int. Cl.
*B60R 11/00* (2006.01)
*B60R 11/02* (2006.01)

(58) Field of Classification Search
CPC . B60N 2/68; B60N 2/682; B60N 2/70; B60N 2/7094; B60R 11/0217; B60R 2011/0015
See application file for complete search history.

(56) References Cited

U.S. PATENT DOCUMENTS

| | | | |
|---|---|---|---|
| 5,601,332 | A | 2/1997 | Schultz |
| 10,131,317 | B1 | 11/2018 | Harrington |
| 10,272,800 | B2 | 4/2019 | Whitmore |
| 10,882,432 | B1 | 1/2021 | Bosen |
| 2016/0129818 | A1 | 5/2016 | Sahashi |
| 2017/0368960 | A1 | 12/2017 | Whitmore |
| 2018/0022258 | A1 | 1/2018 | Matsushima |
| 2018/0070731 | A1 | 3/2018 | Jibiki |
| 2019/0001854 | A1 | 1/2019 | Gunn |
| 2019/0176664 | A1 | 6/2019 | Walser |
| 2020/0070699 | A1 | 3/2020 | Kakishima |
| 2020/0139867 | A1 | 5/2020 | Ceglarek |
| 2021/0039583 | A1 | 2/2021 | Gumprecht |
| 2022/0194275 | A1 | 6/2022 | Schulz |

FOREIGN PATENT DOCUMENTS

| | | | |
|---|---|---|---|
| DE | 102010005801 | | 6/2011 |
| DE | 102011087172 | A1 | 5/2012 |
| DE | 102018208693 | A1 | 12/2019 |
| EP | 4029730 | A1 | 7/2022 |
| JP | 2008279109 | A | 11/2008 |
| KR | 20120000864 | U | 2/2012 |
| KR | 200481496 | Y1 | 10/2016 |

OTHER PUBLICATIONS

Office Action (Non-Final Rejection) dated Jan. 10, 2023 for U.S. Appl. No. 17/545,329, B2020600FRUS US-U | (47631-349846), (pp. 1-9).

Office Action (Non-Final Rejection) dated Jul. 18, 2023 for U.S. Appl. No. 17/545,329, B2020600FRFRUS US-U | (pp. 1-9).

Office Action (Final Rejection) dated Jan. 10, 2024 for U.S. Appl. No. 17/545,329 (pp. 1-11).

VEHICLE SEAT BACKREST

PRIORITY CLAIM

This application is a continuation of U.S. patent application Ser. No. 17/545,329, filed Dec. 8, 2021, which claims priority to French Application No. FR2012942, filed Dec. 9, 2020, each of which is expressly incorporated by reference herein.

BACKGROUND

The present disclosure relates to a vehicle seat backrest, in particular of a motor vehicle. The present disclosure also relates to a vehicle seat comprising such a backrest, a method for assembling a vehicle seat backrest and a vehicle seat comprising such a backrest. The present disclosure also relates to a method for replacing a central upholstery module of such a seat backrest.

SUMMARY

According to the present disclosure, a vehicle seat backrest comprises a backrest armature, at least one central upholstery module and two side upholstery modules each arranged on a respective side of the central upholstery module, each of the at least three upholstery modules being fixable to the backrest armature independently of the other two upholstery modules, each of the at least three upholstery modules being preferably fixed to the backrest armature independently of the other two upholstery modules.

In illustrative embodiments, the upholstery of such a backrest can easily and quickly be assembled onto the backrest armature. In addition, by adapting the components of the central upholstery module and/or of the side upholstery modules, it is possible, always keeping the same general configuration of the backrest with three independent upholstery modules, to assemble vehicle seat backrests having variable functionalities.

In illustrative embodiments, the vehicle seat backrest includes one or several of the following features, taken alone or in combination:

- each upholstery module includes a upholstery independent with respect to the upholstery of the two other upholstery modules;
- the central upholstery module includes at least one support, fixed to the backrest armature, and a foam block covering all or part of the support;
- the central upholstery module and/or the side upholstery modules include/s elastic means for limiting deflection of the support of the central upholstery module, relative to the backrest armature and/or the foam block with respect to the support of the central upholstery module;
- the central upholstery module comprises an air pump and a plurality of inflatable pouches, in fluid communication with the air pump, preferably via a valve for selectively controlling the air supply to the inflatable bags;
- a fan is fixed to the support, the foam block of the central upholstery module comprising through holes, in fluid communication with the fan;
- at least one loudspeaker and/or at least one vibrating device is fixed on the support so as to be arranged between the support and the foam block of the central upholstery module or at least partially housed in the foam block of the central upholstery module;

- each side upholstery module comprises a foam block and, preferably, a lateral hold adjustment device and/or a lateral airbag;
- each side upholstery module further includes a support to which the foam block is fixed;
- the central upholstery module and/or at least one, preferably each of the side upholstery modules comprise/s a respective cover, each cover covering at least part of the respective foam block, if applicable;
- the vehicle seat backrest further comprises a common cover covering all or part of the three upholstery modules, in particular the foam blocks of the three upholstery modules, if applicable.

In another aspect, a motor vehicle seat is also described, comprising a seating base with a seating base armature and a backrest as described above in all its combinations, the backrest armature being fixed to the seating base armature, preferably so as to be pivotable about a transverse axis.

In illustrative embodiments, there is described a method of assembling a motor vehicle seat backrest as described above in all its combinations, comprising the steps of:

- providing a backrest armature;
- providing at least three upholstery modules including a central upholstery module and two side upholstery modules intended to be each arranged on a respective side of the central upholstery module;
- fixing each of the upholstery modules to the backrest armature.

In illustrative embodiments, a method of manufacturing a vehicle seat is described, comprising the steps of:

- providing a seating base with a seating base armature; assembling a backrest by implementing the method described above in all its combinations; and
- fixing the backrest to the seating base, preferably so that the backrest can pivot about an axis transverse with respect to the seating base.

In illustrative embodiments, a method for replacing a central upholstery module of a seat backrest as described above is also described, in all its combinations, including the steps of:

- removing a first central module from the backrest armature;
- fixing a second central module to the backrest armature.

In illustrative embodiments, the steps of removing and/or fixing is/are carried out without disassembling at least one of the side upholstery modules, preferably neither of the two side upholstery modules.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
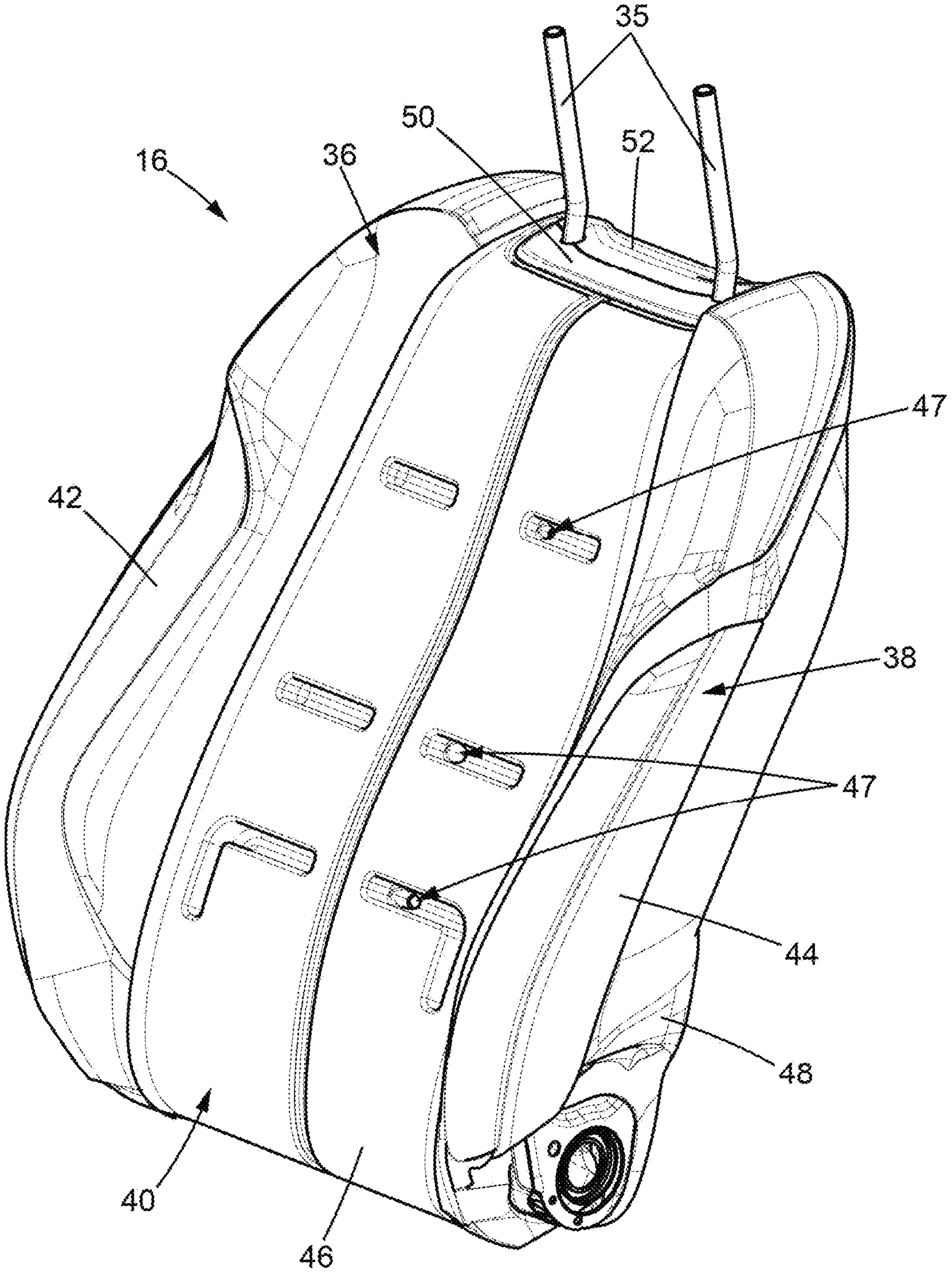
Figure 3:
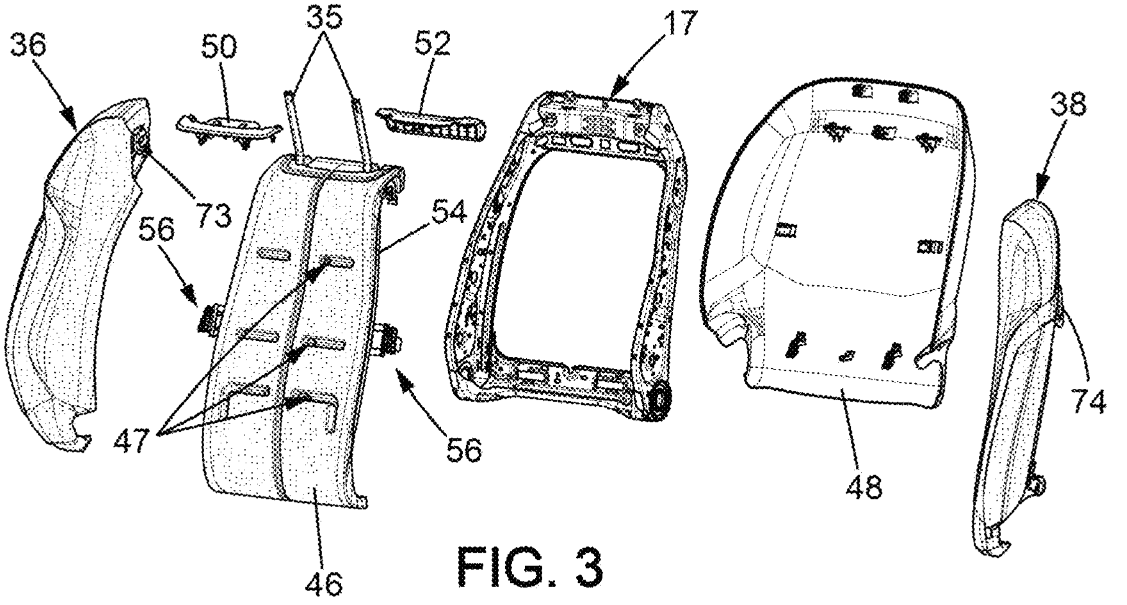
Figure 4:
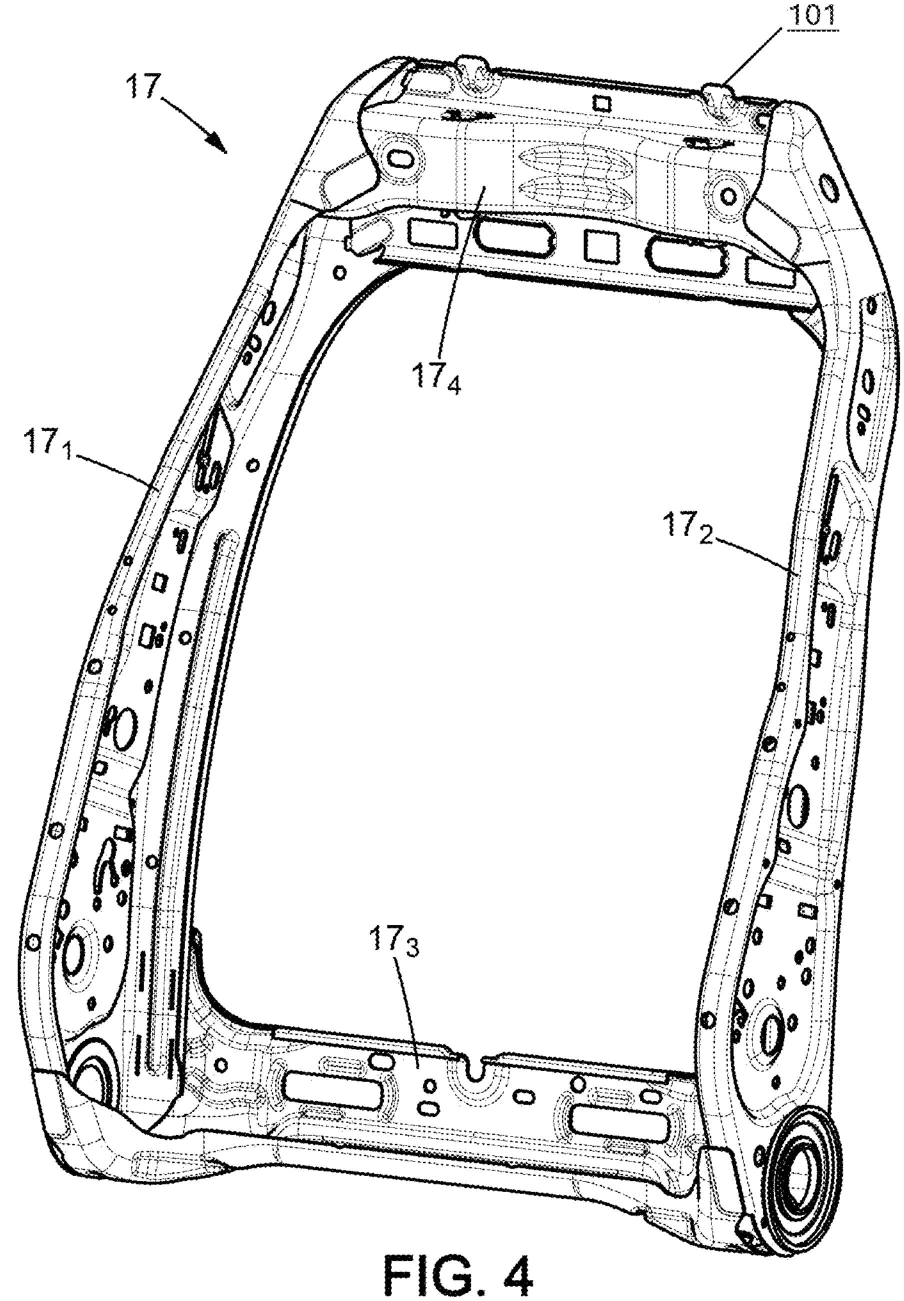
Figure 5:
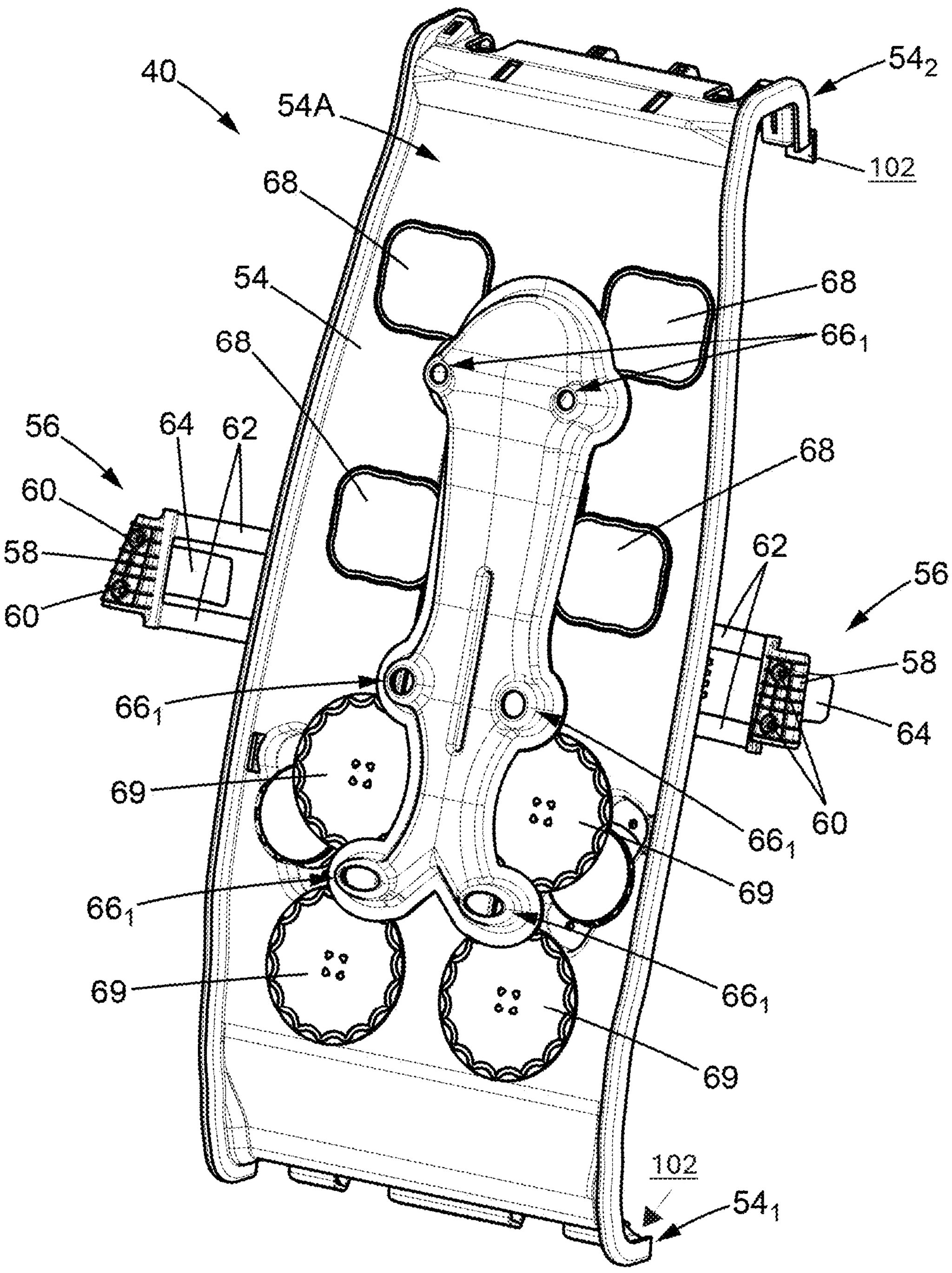
Figure 6:
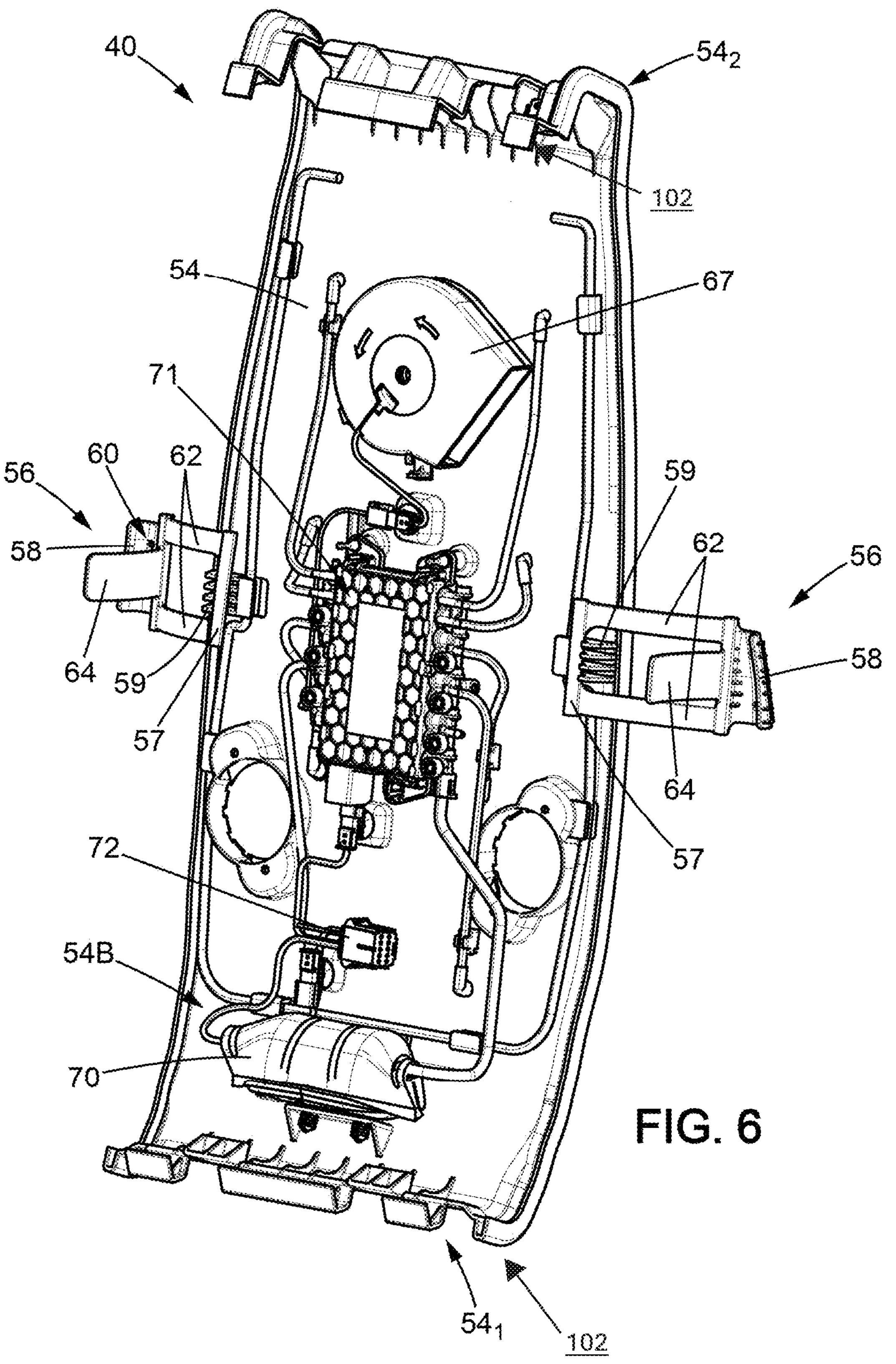
Figure 7:
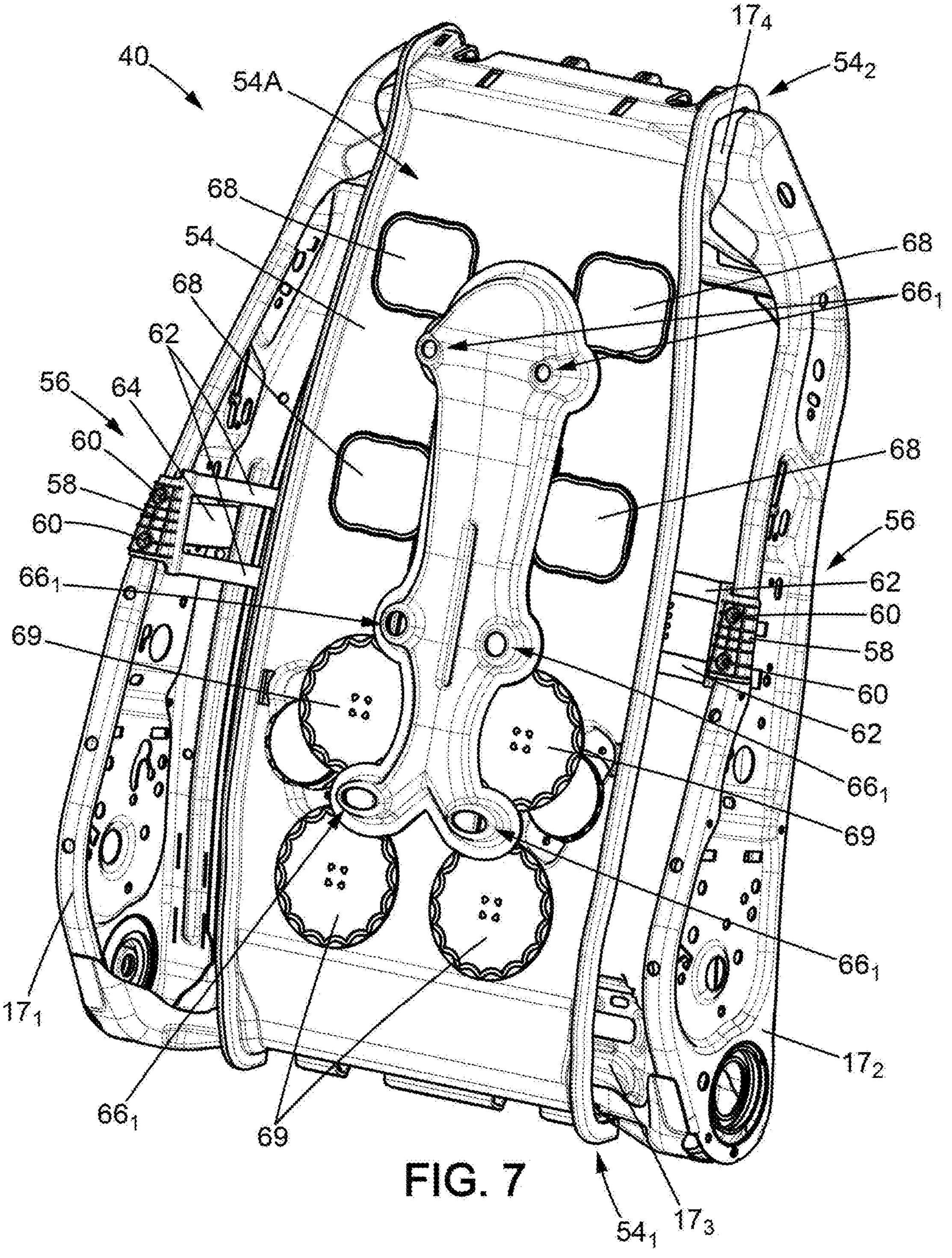
Figure 8:
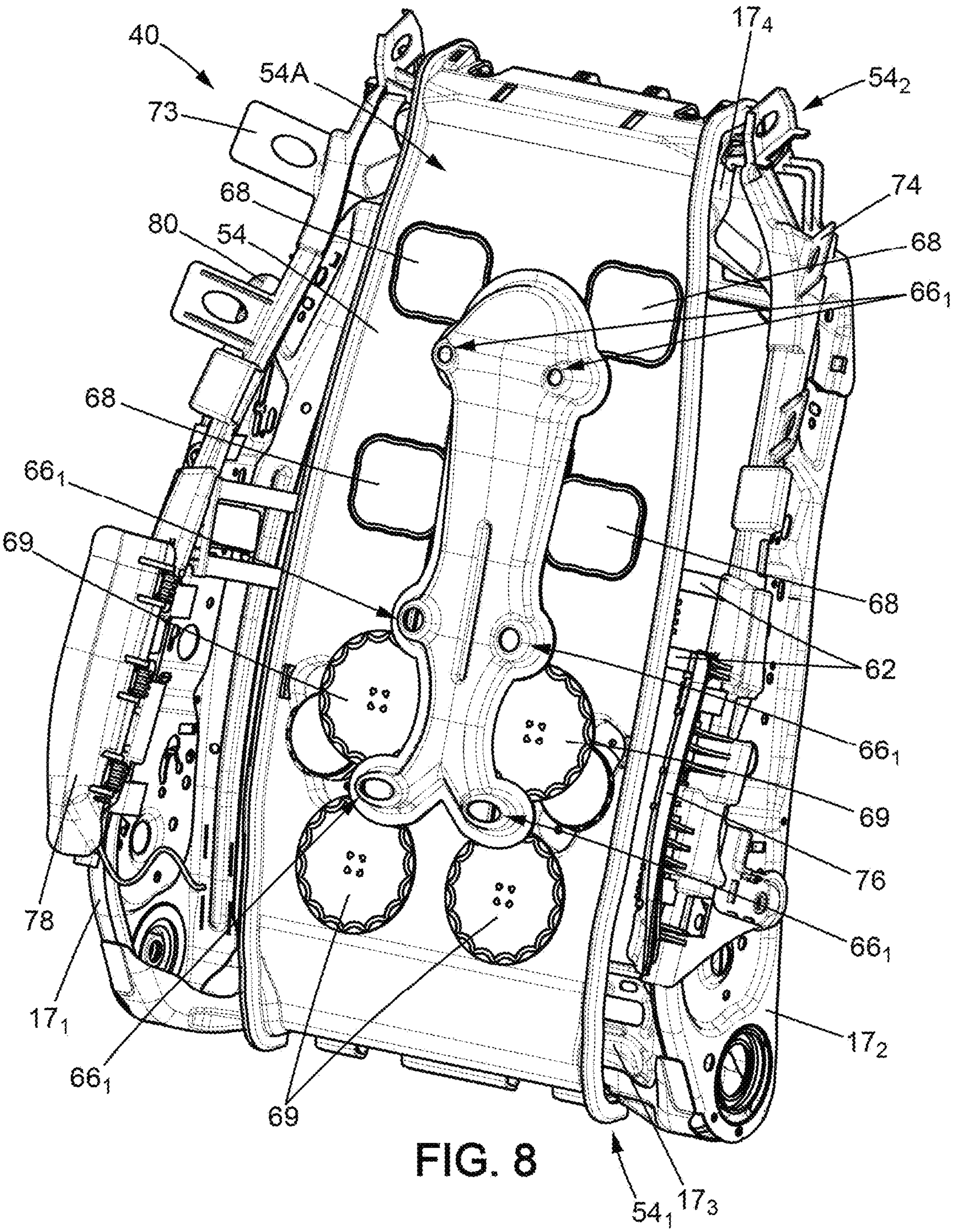

The detailed description particularly refers to the accompanying FIGURES in which:

FIG. 1 schematically shows a side view of an example of a vehicle seat;

FIG. 2 schematically shows in perspective the backrest of the vehicle seat of FIG. 1;

FIG. 3 schematically shows an exploded view of the vehicle seat backrest of FIG. 2;

FIG. 4 schematically shows in perspective the armature of the vehicle seat backrest of FIGS. 2 and 3;

FIG. 5 schematically shows in perspective a first face of a central upholstery module support implemented in the vehicle seat backrest of FIGS. 2 and 3;

FIG. 6 schematically shows in perspective the second face, opposed to the first face, of the central upholstery module support of FIG. 5;

FIG. 7 schematically shows the central upholstery module support of FIGS. 5 and 6 assembled on the backrest armature of FIG. 4; and FIG. 8 schematically shows a perspective view of the vehicle seat backrest of FIGS. 2 and 3, devoid of the foam blocks of the various upholstery modules.

DETAILED DESCRIPTION

On the different FIGURES, the same reference signs designate identical or similar features. For the sake of brevity, only the features that are useful to understand the embodiment described therein are shown on the FIGURES and are described in detail in the following.

In the following description, when referring to absolute position qualifiers, such as “front”, “back”, “up”, “down”, “left”, “right”, etc., or relative position qualifiers, such as “above”, “below”, “upper”, “lower”, etc., or to orientation qualifiers, such as “horizontal”, “vertical”, etc., reference shall be made, unless otherwise specified, to the orientation of FIGURES or of a vehicle seat in its normal position of use.

In particular, the longitudinal direction X means the seat longitudinal direction. The seat longitudinal direction shall be construed as being the same as the longitudinal direction of the automotive vehicle in which the seat is assembled. This longitudinal direction X corresponds to the normal running direction of the vehicle. The longitudinal direction X is horizontal. The seat transverse direction Y thus corresponds to the transverse or lateral direction of the automotive vehicle. This transverse direction corresponds to a direction perpendicular to the vehicle normal running direction. The transverse direction Y is horizontal. Finally, the vertical direction Z is a seat vertical direction, perpendicular to both longitudinal and transverse directions.

FIG. 1 schematically shows a motor vehicle seat 10 assembled on a runner mechanism 12.

The seat 10 comprises a seating base 14, with a seating base armature 15, on which a backrest 16, with a backrest armature 17, is assembled. The backrest armature 17 is herein pivotable about a transverse axis 18, relative to the seating base armature 15. To this end, an articulation mechanism 20 is arranged between the seating base armature 15 and the backrest armature 17.

The seating base 14 is assembled on mobile profiles 22, also called slides or male profiles, by means of feet 24, 26. Each mobile profile 22 is part of a runner 12 and is associated with a fixed profile 28. The fixed profile 28 is also called a rail or a female profile. The fixed profile 28 is fixed to the floor 30 of a motor vehicle.

The seat 10 comprises in this example a manual control element 32, called a lifter, for slidingly controlling the runners 12. This manual control element 32 makes it possible in particular to block and unblock sliding stopping systems of the mobile profiles 22 with respect to the respective fixed profiles 28. Once the stopping systems have been released, the manual control element 32 can also be used to slide the mobile profiles 22 relative to their respective fixed profiles 28 of the runner 12 in the longitudinal direction X of the runners 12. The fixed 28 and mobile 22 profiles of the runners 12 are generally metallic.

Alternatively, the movement of the mobile profiles 22 with respect to the fixed profiles 28 is controlled using an actuator.

According to the illustrated example, the seat 10 can also include a headrest 34, with a headrest armature 35, partially visible in FIG. 2, in the form of rods 35 fixed to the backrest armature 17.

Hereinafter, the backrest 16 of the vehicle seat 10 is described in more detail.

As can be seen in FIG. 2 in particular, the illustrated backrest 16 comprises a first side upholstery module 36, a second side upholstery module 38 and a central upholstery module 40, such that the first and second side upholstery modules 36, 38 are each arranged on a respective side of the central upholstery module 40. Each upholstery module 36, 38, 40 comprises here a block of foam 42, 44, 46, the only visible element of the respective upholstery module in FIG. 2. As can be seen in particular in FIG. 2, the foam block 46 of the central upholstery module 40 may include holes 47. These holes 47 allow ventilation of the seat occupant back, as will be described later.

In the illustrated example, the central upholstery module 40 forms the leaning face of the backrest cup 16, that is to say the central part for the back of the seat occupant to lean on, while the side modules 36, 38 form the side portions projecting with respect to the cup of this same face for the back of the seat occupant to lean on.

It should be noted here that the upholstery modules 36, 38, 40 exist prior to being fixed onto the backrest armature 17. Thus, these upholstery modules 36, 38, 40 are not produced by overmolding the backrest armature 17 and/or structural elements already attached to the backrest armature 17. This does not prevent the foam blocks 42, 44, 46 of the different upholstery modules 36, 38, 40 from being produced by overmolding a possible support for the respective upholstery module 36, 38, 40. However, such overmolding is carried out prior to the support being fixed onto the backrest armature 17.

The backrest 16 also comprises a shell 48, hereinafter referred to as the “rear shell”, defining most of the backrest 16 rear face. The backrest 16 further comprises, according to the illustrated example, two upper trim elements 50, 52. The two trim elements 50, 52 surround the support rods 35 of the headrest 34.

Remarkably, herein and as illustrated schematically in FIG. 3, each upholstery module 36, 38, 40 is fixed to the backrest armature 17, independently of the other two upholstery modules 36, 38, 40. In other words, each upholstery module 36, 38, 40 can be fixed to the backrest armature 17 while the other two upholstery modules 36, 38, 40 are not fixed to the backrest armature 17. Thus, each upholstery module 36, 38, 40 is able to be fixed onto the backrest armature 17 independently of the other two upholstery module 36, 38, 40. An upholstery module 36, 38, 40 may however be fixed to another upholstery module 36, 38, 40. However, preferably, the upholstery modules 36, 38, 40 are independent in that there is no direct fixation of a upholstery module 36, 38, 40 to another upholstery module 36, 38, 40. The foam block 46 of the central upholstery module 40 can however be assembled squeezed between the foam blocks 42, 44 of the two side upholstery modules 36, 38.

The rear shell 48 can also be directly fixed to the backrest armature 17, preferably independently of the upholstery modules 36, 38, 40. The rear shell 48 can be fixed to the backrest armature 17 by any suitable means, in particular by screwing or riveting. According to yet another example, the rear shell 48 is elastically interlocked onto the backrest armature 17. Advantageously, the rear shell 48 is adapted to be fixed onto the backrest armature 17 after fixing the upholstery modules 36, 38, 40. This can indeed allow access from the seat 10 rear, to the various elements of the upholstery modules 36, 38, 40 needing to be connected functionally, after the upholstery modules 36, 38, 40 have been fixed onto the backrest armature 17, before fixing the rear shell 48.

Further, the two trim elements 50, 52 are fixed, according to the illustrated example, on the central upholstery module 40. These trim elements 50, 52 can be fixed to the central upholstery module 40 using any suitable means accessible to those skilled in the art. In particular, the trim elements 50, 52 can be elastically interlocked on the foam block 46 of the central upholstery module 40. A trim element 50, 52 can also be fixed to the other trim element 52, 50. Here again, any fixation means accessible to those skilled in the art can be implemented, in particular by elastic fitting of the trim elements 50, 52.

As illustrated in FIG. 4, the backrest armature 17 comprises a first column $17_1$, a second column $17_2$, a first cross member $17_3$, hereinafter referred to as "lower cross member $17_3$", and a second cross member $17_4$, hereinafter referred to as "upper cross member $17_4$". The columns $17_1$, $17_2$ and the cross members $17_3$, $17_4$ form a backrest armature 17 in the form of a frame. To this end, the columns $17_1$, $17_2$, and the cross members $17_3$. $17_4$ may be fixed together, in particular welded together. Alternatively, the backrest armature 17 is in one piece, the latter being for example molded.

On the backrest armature 17, the central upholstery module 40 illustrated in FIGS. 5 and 6 is fixed, respectively in front view and in rear view, without the associated foam block 46.

In these FIGURES, the central upholstery module 40 comprises a support 54, herein shaped as a plate. The support 54 is in particular more rigid than the foam block 46 of the central upholstery module 40. The foam block 46 of the central upholstery module 40 is fixed to support 54. In particular, the foam block 46 can be overmolded on support 54. Alternatively, the foam block 46 can be glued or elastically interlocked on the support 54, the foam block 46 preferably having plastic inserts in the latter case, forming elastic fitting protrusions on the support 54.

The support 54 extends substantially in a longitudinal direction. The longitudinal ends $54_1$, $54_2$ of the support 54 are curved herein. Thus, the upper end $54_2$ of the support 54 can rest on the upper cross member $17_4$ of the backrest armature 17, as illustrated in FIG. 7. Similarly, the lower end $54_1$ of the support 54 can accommodate the lower cross member $17_3$ of the backrest armature 17 as can be seen in FIG. 7. The ends $54_1$, $54_2$ herein have means for fixation to the lower $17_3$ and upper $17_4$ cross members, respectively, of the backrest armature 17. These fixing means may in particular include:

- complementary protrusions, for example for force-fastening the central upholstery module 40 onto the backrest armature 17; and/or
- corresponding holes for fixing by means of screws, bolts or rivets, for example; and or
- complementary elastic fitting protrusions (or clips) 101, 102, as illustrated in FIGS. 4-6, for fixing by elastic fitting.

The latter solution appears to be the most favorable, limiting the number of parts and operations required to fix the support 54 onto the backrest armature 17.

In addition, according to the illustrated example, the central upholstery module 40 may further include straps 56 limiting the support 54 deflection relative to the backrest armature 17. Here, the straps 56 also make it possible to fix the support 54 on the columns $17_1$, $17_2$ of the backrest armature 17. Each strap 56 herein comprises a beam 57, in contact with support 54. Here, the beam 57 is fixed to the support 54. To this end, the support 54 comprises, in the illustrated example, hooks 59 for elastic fitting of a respective beam 57. It should be noted here that the hooks 59 are on the face 54B of the support 54 which is opposite the face 54A intended to be oriented towards the seat occupant. This ensures better comfort for the occupant and/or better support 54 hold, in particular against the support 54 deflection when an occupant is leaning against the backrest 16. According to a first variation, the straps 56 can be fixed onto the support 54 before the central upholstery module 40 being assembled onto the backrest armature 17. According to another variant, the straps 56 are fixed to the backrest armature 17 prior to the central upholstery module 40 being assembled onto the backrest armature 17. In this case, when assembling the central upholstery module 40, the beams 57 fit elastically into the hooks 59 by simple relative movement of the central upholstery module 40 in the direction of the backrest armature 17.

Each strap 56 further comprises at least a first blade 62, herein two blades 62. Each first blade 62 extends from a respective beam 57. The first blades 62 are advantageously more flexible than support 54. The first blades 62 ensure a more flexible support 54 hold when a seat occupant leans against the backrest 16.

At the end of the first blades 62, opposite the beam 57, each strap 56 defines a housing 58 for accommodating a portion of a respective column $17_1$, $17_2$, and holes 60 provided on the wall forming the housing 58, which are intended to be arranged facing corresponding holes on the columns $17_1$, $17_2$, for fixing by screw, bolt or rivet, in particular.

In addition, in the illustrated example, each strap 56 comprises a second blade 64, oriented substantially perpendicular to the first blades 62 and which can each be bearing on a respective column $17_1$, $17_2$ of the backrest armature 17. These second elastic blades 64 ensure the beam 57 of the relevant strap 56 to be correctly positioned towards the front of the backrest 16. These second blades 64 are preferably more rigid than the first blades 62. The second blades 64, here compressed between the support 54 and the backrest armature 17 tend to push back the support 54, thus limiting the support 54 deflection relative to the backrest armature 17 when a seat occupant leans against the backrest 16. The elasticity of the blades 62, 64 further provides comfort to the vehicle seat occupant, in that the support 54 can move slightly relative to the backrest armature 17, by elastic deformation of the blades 62, 64.

The straps 56, in order to be fixed to the backrest armature 17, may in particular include:

- complementary protrusions, for example for force-fastening the straps 56 onto the backrest armature 17; and/or
- corresponding holes for fixing by means of screws, bolts or rivets, for example; and/or
- complementary elastic fitting protrusions (or clips), for fixing by elastic fitting.

As can be seen in FIGS. 4 to 8, support 54 can be equipped with different elements each associated with one or several comfort functions for the seat 10 occupant.

According to the illustrated example, an air guide 66 is thus fixed to the support 54, in a sealed manner. The air guide 66 has holes $66_1$ intended to be arranged substantially opposite the holes 47 formed in the foam block 46 of the central upholstery module 40. This air guide 66 is arranged at a through opening formed in the support 54, a fan 67 being fixed on the opposite face 54B of the support 54 to blow air into the air guide 66. Advantageously, the air guide 66 can have an ergonomic shape ensuring that the vehicle seat occupant back is more comfortably accommodated. This function for more comfortably accommodating the seat occupant back may, in a variation, be provided by an element separate from an air guide 66.

Furthermore, inflatable pouches 68, 69 are fixed on the support 54, here on the face 54A of the support 54 intended to be oriented towards the back of the seat 10 occupant. In the illustrated example, the inflatable pouches 68, 69 are substantially regularly distributed on the support 54, in a matrix. In the example of FIG. 5, eight inflatable pouches 68, 69 are thus distributed in four rows of two columns of inflatable pouches 68, 69. The eight inflatable pouches 68, 69 can be selectively supplied with air by an air pump 70, via a valve 71. Thus, by controlling the valve 71 according to a particular inflation scheme applied to the inflatable pouches 68, 69, it is possible to obtain a massaging effect on the seat 10 occupant back. Alternatively, all the inflatable pouches 68, 69 can be supplied with air simultaneously, in particular to improve holding the seat occupant back, wherein the inflatable pouches 68, 69 inflate until they adjust to the shape of the seat occupant back. According to yet another alternative, part of the inflatable pouches 68 makes it possible to massage a part of the seat 10 occupant back, in particular the upper part of the back, while the other part of the inflatable pouches 69 perform a seat occupant back holding function, in particular a holding function for a low part of the seat occupant back.

Other comfort functions can be associated with the support 54. In particular one or several loudspeakers and/or one or several vibrating devices (or in English "exciter") and/or one or several resistive heating wires for the vehicle seat 10 occupant back may be fixed to support 54. Preferably, the loudspeaker(s) and/or the vibrating device(s) and/or the resistive wire(s) are arranged between the support 54 and the foam block 46 of the central upholstery module 40 or at least partially housed in the foam block 46 of the central upholstery module 40.

Preferably, all the elements fixed to the support 54 requiring an electrical power supply and/or a control from outside the seat and/or an information transfer to outside the seat are electrically connected to a single connector 72 providing the link with outside the seat. Thus, assembling the seat is greatly simplified, only further requiring an electrical connection between outside the seat and the connector 72 to supply electric power, to control and to communicate with the adapted elements of the central upholstery module 40. The connector 72 is advantageously arranged on the face 54B of the support 54 intended to be opposite the back of the seat occupant.

Furthermore, as can be seen in particular in FIG. 7, on each column $17_1$, $17_2$ of the backrest armature 17, a support 73, 74 of the first side upholstery module 36 and of the second side upholstery module 38, is respectively fixed. Each of the support 73, 74 can be fixed to the associated column $17_1$, $17_2$ by elastic fitting and/or screwing and/or riveting and/or force-fastening, in particular.

On each support 73, 74, the foam block 42, 44 associated with the first or second side upholstery module 36, 38 is fixed. In particular, each foam block 42, 44 can be overmolded on the respective support 73, 74. Each foam block 42, 44 can alternatively be glued or elastically interlocked on the associated support 73, 74. In the latter case, the foam blocks 42, 44 may include plastic inserts.

An inflatable pouch 76, 78 of a device for adjusting the lateral hold of the seat occupant back (in English "bolster") is fixed on each support 73, 74 of the side module.

On the support 73 of the first side upholstery module 36 illustrated in FIG. 8, an inflatable pouch 78 and a pump 80 adapted to inflate the inflatable pouch 78 are fixed. The inflatable pouch 78 has a comfort function rather than a safety function, in that it may allow a massaging effect and/or a better adaptation of the side upholstery module 36 shape to the seat occupant. An air pump 80 can also be fixed to the support 74 of the other side upholstery module, in order to inflate the associated inflatable pouch 78. Advantageously, in fact, an air pump 80 is arranged in each side upholstery module 36, 38 to avoid an aeraulic connection between an upholstery module 36, 38, 40 and another one 36, 38 40.

Each side upholstery module 36, 38 may further be provided with one or several massaging inflatable cushions and/or a lateral airbag device. The side upholstery module 36 or 38 can be preliminarily provided with the airbag 80, before assembling it onto the armature.

Here again, the side upholstery modules 36, 38 can include other comfort functions.

As with the central upholstery module 40, the elements of each side upholstery module 36, 38 requiring electrical power supply, control, or information transfer, are preferably electrically linked to a single connector of each side upholstery module 36, 38. Assembling the seat backrest is thus simplified.

The backrest 10 as described above is particularly easy to assemble.

Thus, a method of assembling such a backrest may include a first step consisting of providing a backrest armature 17 and the three upholstery modules 36, 38, 40. At this stage, the backrest armature 17 may possibly already be fixed to the seating base armature 15 and/or be already accommodating the headrest armature 35 in whole or in part. In particular, the support rods of the headrest may already be fixed on the backrest armature 17.

Secondly, the upholstery modules 36, 38, 40 are fixed onto the backrest armature 17. The fixing sequence of the upholstery modules 36, 38, 40 may in particular depend on the geometry of the supports 54, 73, 74 of the various upholstery modules 36, 38, 40 and of their fixations to the backrest armature 17. According to the backrest example described above, it is possible, e.g., to start by fixing the central upholstery module 40, then the two side modules 36, 38. Alternatively, however, the central upholstery module 40 can be fixed after the two side modules 36, 38 having been fixed.

It should be noted that these successive fixing operations can be carried out in whole or in part, by an automaton. In particular, the central upholstery module 40 may be "hooked" on the upper cross member $17_4$ of the backrest armature 17, then the lower end $54_1$ can be fixed on the lower cross member $17_3$ of the backrest armature 17. Screwing the second fixation means 56 can take place after this step. By "hooked" is meant herein that the folded-back end $54_2$ of the support 54 of the central upholstery module 40 bears on the upper cross member $17_4$ of the backrest armature 17, wherein complementary protrusions of the folded end $54_2$ of the support 54, on the one hand, and of the backrest armature 17 and/or of the headrest armature 35, on the other hand, guide a rotational movement of the support 54 with respect to a transverse extension axis of the upper cross member $17_4$ of the backrest armature 17. Herein, for example, notches made at the end $54_2$ of the support 54 and accommodating the headrest support rods 35 allow guiding the movement of the central upholstery module 40 with respect to the backrest armature 17.

The required electrical or even aeraulic connections are then made. Preferably, only one electrical connection is to be made for each upholstery module 36, 38, 40.

Finally, the rear shell 48 is fixed onto the backrest armature 17 and the trim elements 50, 52. Here again, the fixing sequence of the rear shell 48 and the trim elements 50, 52 may vary.

Thus, assembling the seat 10 is very simple to perform. In addition, it can be identical or substantially identical, regardless of the functions integrated or not in the backrest 16. It is thus possible to provide a single automaton to assemble a wide variety of separate vehicle seat backrests, with a substantially constant assembling time. The assembly line for such a range of seats is thus simpler and easier to manage.

It should also be noted that an upholstery module 36, 38, 40 can easily be changed, without having to change the other upholstery modules 36, 38, 40, or even without having to disassemble them. It may be advantageous, for example, to replace the central upholstery module 40 with a central upholstery module 40 accommodating one or several new comfort functions as compared to the former central upholstery module 40. In this case, not removing the side upholstery modules means not to interfere with the safety functions of the seat, namely the two side airbags present in or associated with the side upholstery modules 36, 38. The failure risks of these safety systems after the operation of replacing the central upholstery module 40 are thus limited.

Thus, in the illustrated example, each upholstery module 36, 38, 40 comprises a support and a foam block fixed to the support. Alternatively, an upholstery module may be devoid of support, or even include a single foam block. When an upholstery module is devoid of support as described above, it may include rigid inserts, incorporated in the foam block, to facilitate fixation thereof to the backrest armature. Such inserts can be incorporated by overmolding the corresponding foam block on these inserts. The term “rigid” is here to be construed as meaning that the inserts are in particular more rigid than the foam.

The support 54 of the central upholstery module 40 can also take other forms than that described above. In particular, the support 54 may be a frame comprising two cross members, which are preferably rigid, and two columns, which are rigid or flexible, spring elements, in particular elastic wires extending between the cross members and/or between the columns. In this case, advantageously, the cross members are fixed to the cross members of the backrest armature. The columns of the support may then be free with respect to the columns of the backrest armature 17. Straps 56 may also be provided between the columns of the support thereby formed and the columns of the backrest armature 17, in particular when the columns are rigid. The foam block of the central upholstery module can then be overmolded onto the support 54, in particular onto the cross members of the support 54 in the form of a frame. Even when support 54 is not in the form of a plate as described above, one or several elements ensuring a comfort function can be fixed to the support 54. These elements are in particular those described above. This is especially true when the support has a frame shape as described above.

Also, each upholstery module 36, 38, 40 may include a cover covering all or part of the respective foam block 42, 44, 46. The cover may in particular be arranged in the mold serving for overmolding the foam block 42, 44, 46 onto the respective support 54, 73, 74. The cover then adheres to the foam block 42, 44, 46. Alternatively, the cover can be fixed on the foam block 42, 44, 46 and/or on the support 54, 73, 74 after forming the foam block 42, 44, 46. In other words, the cover can be separately placed onto the foam block 42, 44, 46 and/or onto the support 54, 73, 74. The cover is then fixed by any means accessible to those skilled in the art.

According to yet another variant, a single cover is implemented to cover the three foam blocks 42, 44, 46 of the upholstery modules 36, 38, 40. Here again, in this case, the cover is separately placed onto the foam blocks 42, 44, 46 and/or onto the respective supports 54, 73, 74 of the upholstery modules 36, 38, 40, or even onto the backrest armature 17 and/or onto the rear shell 48. And here again, fixing the cover is carried out by any means accessible to those skilled in the art.

Advantageously, each upholstery module 36, 38, 40 is trimmed independently of the other two, as described above. Alternatively, however, it is conceivable that a foam block, for example, is shared between several upholstery modules, in particular to all of the upholstery modules 36, 38, 40.

Finally, in the illustrated example, the straps 56 are fixed between the support 54 and the backrest armature 17. Alternatively, however, the straps can be fixed between the support 54 and the side modules 36, 38, in particular the supports 73, 74 of the side modules 36, 38. Straps 56 can also be fixed on the backrest armature 17 and/or on the supports 73, 74 of the side upholstery modules 36, 38, and only be in contact with the support 54, in particular with the face 54B of the support 54 which is not oriented towards the seat occupant.

Even in the case where the straps 56 are fixed in the side modules 36, 38, the central upholstery module 40 can still be fixed to the backrest armature 17, independently of it being fixed to the side modules 36, 38 via the straps 56.

More generally, in the example described above, each upholstery module 36, 38, 40 is fixed to the backrest armature 17 independently of the other upholstery modules 36, 38, 40. In other words, fixation means are implemented only between the backrest armature, on the one hand, and each of the upholstery modules 36, 38, 40, on the other hand. Alternatively, however, each upholstery module 36, 38, 40 can be fixed to the seat armature 17 independently of the other upholstery modules 36, 38, 40. Thus, although there are fixation means implemented between at least two upholstery modules 36, 38, 40, in particular between the central upholstery module 40 and one or both side upholstery modules 36, 38, each upholstery module 36, 38, 40 includes fixation means adapted for securing the relevant upholstery module on the backrest armature 17, independently of the other upholstery modules 36, 38, 40.

A backrest (16) of a vehicle seat (10) comprises a backrest armature (17), at least one central upholstery module (40) and two side upholstery modules (36, 38) each arranged on a respective side of the central upholstery module (40). Each of the at least three upholstery modules (36, 38, 40) is fixed to the backrest armature (17) independently of the other two upholstery modules (36, 38, 40).

A comparative vehicle seat backrest may be made by covering a backrest armature with foam. The whole is then covered with a cover.

The comparative seat backrest may incorporate many comfort and/or safety functions. A support may be to the backrest armature, to assemble the various elements used to achieve the comfort and/or safety functions onto the support or onto the backrest armature, then to cover the obtained assembly with foam. A cover then covers the whole.

Thus, depending on the number and the complexity of the functions to be integrated into the backrest of a seat, assembling a backrest differ significantly on an assembly line.

In addition, assembling such a backrest may be carried out at least in part by an operator, who should therefore be able to assemble the different variations of the same backrest.

There is therefore a need for a seat backrest that can be assembled in a substantially identical manner regardless of the functions that it incorporates, with a substantially constant assembling time.

To this end, there is disclosed a vehicle seat backrest comprising a backrest armature, at least one central upholstery module and two side upholstery modules each arranged on a respective side of the central upholstery module, each of the at least three upholstery modules being fixable to the backrest armature independently of the other two upholstery modules, each of the at least three upholstery modules being preferably fixed to the backrest armature independently of the other two upholstery modules.

Thus, the upholstery of such a backrest can easily and quickly be assembled onto the backrest armature. In addition, by adapting the components of the central upholstery module and/or of the side upholstery modules, it is possible, always keeping the same general configuration of the backrest with three independent upholstery modules, to assemble vehicle seat backrests having variable functionalities.

According to preferred embodiments, the vehicle seat backrest includes one or several of the following features, taken alone or in combination:

- each upholstery module includes a upholstery independent with respect to the upholstery of the two other upholstery modules;
- the central upholstery module includes at least one support, fixed to the backrest armature, and a foam block covering all or part of the support;
- the central upholstery module and/or the side upholstery modules include/s elastic means for limiting deflection of the support of the central upholstery module, relative to the backrest armature and/or the foam block with respect to the support of the central upholstery module;
- the central upholstery module comprises an air pump and a plurality of inflatable pouches, in fluid communication with the air pump, preferably via a valve for selectively controlling the air supply to the inflatable bags;
- a fan is fixed to the support, the foam block of the central upholstery module comprising through holes, in fluid communication with the fan;
- at least one loudspeaker and/or at least one vibrating device is fixed on the support so as to be arranged between the support and the foam block of the central upholstery module or at least partially housed in the foam block of the central upholstery module;
- each side upholstery module comprises a foam block and, preferably, a lateral hold adjustment device and/or a lateral airbag;
- each side upholstery module further includes a support to which the foam block is fixed;
- the central upholstery module and/or at least one, preferably each of the side upholstery modules comprise/s a respective cover, each cover covering at least part of the respective foam block, if applicable;
- the vehicle seat backrest further comprises a common cover covering all or part of the three upholstery modules, in particular the foam blocks of the three upholstery modules, if applicable.

In another aspect, a motor vehicle seat is also described, comprising a seating base with a seating base armature and a backrest as described above in all its combinations, the backrest armature being fixed to the seating base armature, preferably so as to be pivotable about a transverse axis.

According to yet another aspect, there is described a method of assembling a motor vehicle seat backrest as described above in all its combinations, comprising the steps consisting in:

- providing a backrest armature;
- providing at least three upholstery modules including a central upholstery module and two side upholstery modules intended to be each arranged on a respective side of the central upholstery module;
- fixing each of the upholstery modules to the backrest armature.

Further, a method of manufacturing a vehicle seat is described, comprising the steps of:

- providing a seating base with a seating base armature;
- assembling a backrest by implementing the method described above in all its combinations; and
- fixing the backrest to the seating base, preferably so that the backrest can pivot about an axis transverse with respect to the seating base.

A method for replacing a central upholstery module of a seat backrest as described above is also described, in all its combinations, including the steps of:

i) removing a first central module from the backrest armature;

ii) fixing a second central module to the backrest armature.

Preferably step i) and/or step ii) is/are carried out without disassembling at least one of the side upholstery modules, preferably neither of the two side upholstery modules.

The invention claimed is:

1. A vehicle seat backrest comprising a backrest armature with an upper cross member and a lower cross member, at least one central upholstery module, wherein the at least one central upholstery module comprises a support fixed to the backrest armature and a foam block covering at least a part of the support, wherein the support extends in longitudinal direction between two longitudinal ends of the support, the two longitudinal ends of the support being curved, a first longitudinal end of the two longitudinal ends of the support resting on the upper cross member of the backrest armature, a second longitudinal end of the two longitudinal ends of the support accommodating the lower cross member of the backrest armature, the two longitudinal ends of the support comprising clips complementary to clips on the upper cross member of the backrest armature and the lower cross members of the backrest armature for fixing the support onto the upper and lower cross members of the backrest armature by elastic fitting.

2. The vehicle seat backrest of claim 1, further comprising two side upholstery modules, each arranged on a respective side of the at least one central upholstery module.

3. The vehicle seat backrest of claim 2, wherein each of the upholstery modules is fixable to the backrest armature independently of the other two upholstery modules.

4. The vehicle seat backrest of claim 2, wherein each of the upholstery modules is fixed to the backrest armature independently of the other two upholstery modules.

5. The vehicle seat backrest of claim 2, wherein each upholstery module comprises a piece of upholstery and wherein each piece of upholstery of each upholstery module is independent with respect to the pieces of upholstery of the other upholstery modules.

6. The vehicle seat backrest of claim 1, wherein the at least one central upholstery module comprises an air pump and a plurality of inflatable pouches, in fluid communication with the air pump.

7. The vehicle seat backrest of claim 1, wherein a fan is fixed to the support, the foam block of the at least one central upholstery module comprising through holes, in fluid communication with the fan.

8. The vehicle seat backrest of claim 1, wherein at least one among a loudspeaker and a vibrating device is fixed on the support so as to be arranged at least partially housed in the foam block of the at least one central upholstery module.

9. The vehicle seat backrest of claim 2, wherein each side upholstery module comprises a foam block.

10. The vehicle seat backrest of claim 2, wherein each side upholstery module comprises at least one among a lateral hold adjustment device and a lateral airbag.

11. The vehicle seat backrest of claim 9, wherein each side upholstery module further comprises a support to which the foam block of the side upholstery module is fixed.

12. The vehicle seat backrest of claim 2, wherein at least one among the central upholstery module and the side upholstery modules comprises a respective cover.

13. The vehicle seat backrest of claim 2, further comprising a common cover covering at least a part of the central upholstery module and of the two side upholstery modules.

14. A motor vehicle seat comprising a seating base with a seating base armature and the vehicle seat backrest according to claim 1, the backrest armature being fixed to the seating base armature.

15. A method of assembling the vehicle seat backrest according to claim 1, comprising the steps of:

providing the backrest armature;

providing at least one central upholstery module; and fixing the at least one central upholstery module to the backrest armature by elastic fitting of the clips on the two longitudinal ends of the support with the complementary clips on the upper cross member of the backrest armature and the lower cross member of the backrest armature.

16. The method of claim 15, wherein the at least one central upholstery module is fixed onto the upper and lower cross members of the backrest armature by:

placing the first longitudinal end of the support of the at least one central upholstery module resting on the upper cross member of the backrest armature, pivoting the at least one central upholstery module around a transverse axis, the clips of the first longitudinal end of the support, on the one hand, and the complementary clips of the backrest armature, on the other hand, guiding the movement of the at least one central upholstery module with respect to the backrest armature, and then fixing the second longitudinal end of the support of the at least one central upholstery module onto the lower cross member of the backrest armature.

17. A method of manufacturing a vehicle seat, comprising the steps of:

providing a seating base with a seating base armature;

assembling the vehicle seat backrest by implementing the method of claim 15; and fixing the vehicle seat backrest to the seating base.

18. The method of manufacturing the vehicle seat according to claim 17, wherein the vehicle seat backrest is fixed to the seating base so as to be able to pivot about an axis transverse with respect to the seating base.

19. A method for replacing the at least one central upholstery module of the vehicle seat backrest according to claim 1, comprising the steps of:

i) removing a first central module from the backrest armature;

ii) fixing a second central module onto the backrest armature.

* * * * *